3,228,716
FASTENER FOR SECURING HINGE PINS OF TUBULAR FURNITURE
Leslie Parkin, Bobbers Mill, England, assignor to United-Carr Incorporated, a corporation of Delaware
Filed Jan. 29, 1963, Ser. No. 254,637
Claims priority, application Great Britain, Feb. 19, 1962, 6,377/62
2 Claims. (Cl. 287—101)

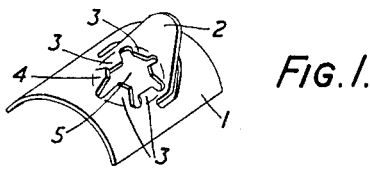
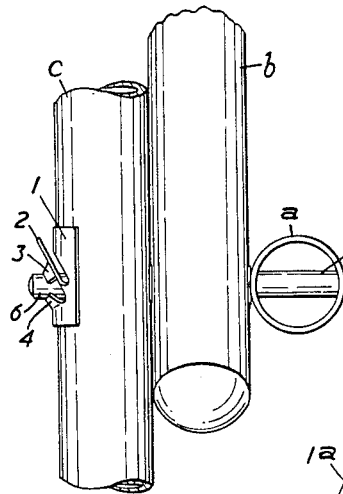
FIG. 2.
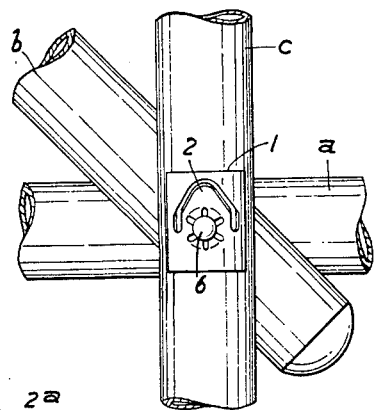
FIG. 3.
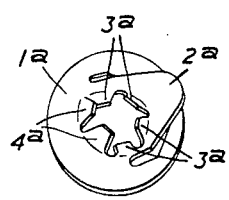
FIG. 4.
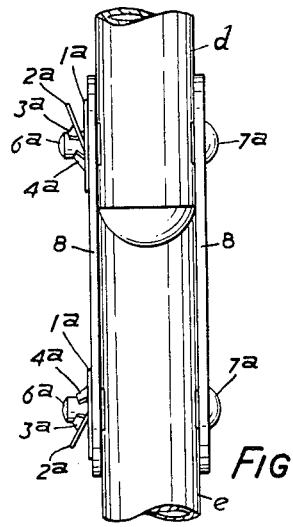
FIG. 5.
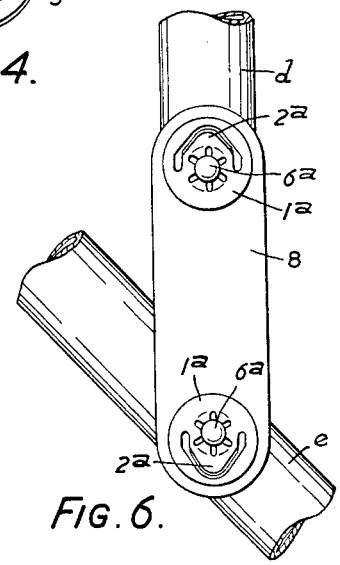
FIG. 6.
INVENTOR
LESLIE PARKIN,
BY Walter S. Jones
ATTORNEY United States Patent Office 3,228,716
Patented Jan. 11, 1966

This invention relates to a fastener for attachment to a rod or rod-like member, and more particularly for detachable gripping engagement with a hinge pin adapted to extend through apertures in two members.

According to the present invention, a fastener comprises a base made of sheet metal and formed with an aperture for receiving the rod-like element, part of the edge of the said aperture being defined by means carried by a flexible arm formed integrally with the base and so arranged that when the arm is flexed, the said means will be displaced into a position wherein the said means and the other portions of the aperture define an aperture of such dimensions as to enable the rod-like element to be freely inserted, and when the arm is released, the said means will be resiliently urged inwardly of the aperture to frictionally grip an inserted rod-like element.

In one arrangement, the aperture is defined by the inner ends of a series of tongues, at least one of the tongues being formed on the inner end of the said arm.

To enable the invention to be fully understod, it will now be described by way of example, with reference to the accompnaying drawings in which:

FIGURE 1 is a perspective view of a fastener according to one embodiment of the invention;

FIGURE 2 is a side view of a series of tubes secured by a rod, the end of the rod having a fastener as illustrated in FIGURE 1 assembled thereon;

FIGURE 3 is a plan view of the assembly illustrated in FIGURE 2;

FIGURE 4 is a perspective view of a second embodiment of the invention;

FIGURE 5 is a side view of a pair of tubes secured by rods having fasteners as illustrated in FIGURE 4 assembled thereon; and FIGURE 6 is a plan view of the assembly illustrated in FIGURE 5.

As shown in FIGURE 1 of the accompanying drawings, the fastener is made of sheet metal and comprises a plate-like base 1 of arcuate shape, a medial portion of which is cut and bent to provide a flexible arm 2 extending outwardly of the plane of the portion of the plate from which it is cut and bent. The inner end of the arm 2 is formed with flexible tongues 3, and other flexible tongues 4 are formed from the plate in such a manner that the inner free ends of the tongues 3 and 4 define an aperture 5.

As shown more particularly in FIGURES 1 and 2 by virtue of the inclined disposition of the arm 2, the tongues 3 formed on the inner end of the arm are disposed at an angle to the base, and their free ends project inwardly of a circle of which the inner free ends of the tongues 4 form arcs.

As shown in FIGURES 2 and 3, hollow tubes a, b, and c forming frame parts of tubular furniture are pivotally secured by a rod 6 extending through aligned apertures in the tubes, the head 7 on one end of the rod abutting one of the outer tubes a, and the free end of the rod projecting outwardly of the other outer tube c. The rod is secured in assembly by a fastener as illustrated in FIGURE 1 which frictionally engages the projecting end of the rod. The fastener is assembled by flexing the arm 2 towards the base so as to withdraw the tongues 3 so that their free ends lie on arcs of the same circle as the free ends of the tongues 4. Thus, the free ends of the several tongues define an aperture having a diameter slightly greater than that of the rod 6 so that the fastener is readily assembled over the end of the rod until the arcuate shaped base fits closely over the adjacent curved surface of the tube c. The arm 2 is then released to allow it to return to the position indicated in FIGURES 1 and 2, whereby the tongues 3 extend inwardly to frictionally engage the rod. The rod is secured in assembly but the tubes are capable of pivotal movement about the rod.

The fastener is readily removed when desired by flexing the arm 2 towards the base to release the grip of the tongues on the rod.

According to the embodiment illustrated in FIGURES 4 to 6, the fastener which is made of sheet metal comprises a flat disc-like plate 1a formed with a flexible arm 2a, having tongues 3a at its inner end, the plate having further tongues 4a, so as to define a rod receiving aperture. The fastener is assembled over the end of the rod by flexing the arm 2a towards the base as described above.

As illustrated in FIGURES 5 and 6, the fastener is used for assembly with rods 6a, which serve to connect links 8 to tubes d, e. As shown, two links are assembled on opposite surfaces of the tubes, the rods being inserted through aligned apertures in the tubes and links. The heads 7a of the rods abut the outer face of one of the links, and the opposite ends of the rods project outwardly of the other link.

A fastener as illustrated in FIGURE 4 is assembled over the projecting end of each rod by flexing the arm 2a to withdraw the tongues 3a, and after the base 1a has been moved into abutment with the link, the arm is released so that the tongues 3a frictionally engage the rods.

As in the first described embodiment, the fasteners can be readily removed by flexing the arms towards the base to release the grip of the tongues 3a. Further, the rods are secured in assembly, but pivotal movement of the links and tubes is permitted.

I claim:

1. A sheet metal fastener for attachment to a rod-like element, said fastener comprising a sheet metal base with a medial portion, said medial portion being cut and bent so as to provide a flexible arm projecting outwardly of the plane of said base at an angle thereto, away from an axis normal to plane of said base said arm being joined to the base at spaced points thereon, the inner end of the arm being formed with flexible tongues disposed at an angle to the base and projecting outwardly of the plane of said base at an angle thereto toward the said axis of said base, said base having another group of flexible tongues projecting outwardly of the plane of said base at an angle thereto toward said axis of said base, the free ends of the tongues on the inner end of the arm projecting inwardly of a circle on which the inner free ends of the tongues on the base lie.

2. An assembly comprising two or more tubes pivotally connected by a rod-like element extending through aligned apertures of said tubes, said rod-like element having a means at one end engaging the outer surface on one of said tubes and a fastener engaged with the opposite end and the surface of one of the other of said tubes, said fastener comprising a sheet metal base with medial portion, said medial portion being bent so as to provide a flexible arm projecting outwardly of the plane of said base at an angle thereto, away from an axis normal to plane of said base, said arm being joined to the base at spaced points thereon, the inner end of the arm being formed with flexible tongues disposed at an angle to the base and projecting outwardly of the plane of said base at an angle thereto toward the said axis of said base; said base having another group of flexible tongues projecting outwardly of the plane of said base at an angle thereto toward said axis of said base, the free ends of the tongues on the inner end of the arm normally projecting inwardly of a circle on which the inner free ends of the tongues on the base lie, the free ends of all of said tongues engaged about said rod-like member.

References Cited by the Examiner

UNITED STATES PATENTS

| | | | |
|---|---|---|---|
| 822,728 | 6/1906 | Earl. | |
| 2,321,158 | 6/1943 | Rees | 85—36 |
| 2,713,386 | 7/1955 | Holtz. | |
| 2,715,350 | 8/1955 | Bedford | 85—36 |
| 2,872,969 | 2/1959 | Thomas | 297—46 X |
| 2,939,584 | 6/1960 | Bergman | 248—164 X |
| 2,957,516 | 10/1960 | Kubisz | 297—46 |
| 3,083,995 | 4/1963 | Bradshaw et al. | 297—46 |

CARL W. TOMLIN, *Primary Examiner.*

THOMAS F. CALLAGHAN, *Examiner.*